Dec. 12, 1950     P. BETTEN ET AL     2,533,308
MEAT HOLDING DEVICE
Filed June 7, 1946     2 Sheets-Sheet 1
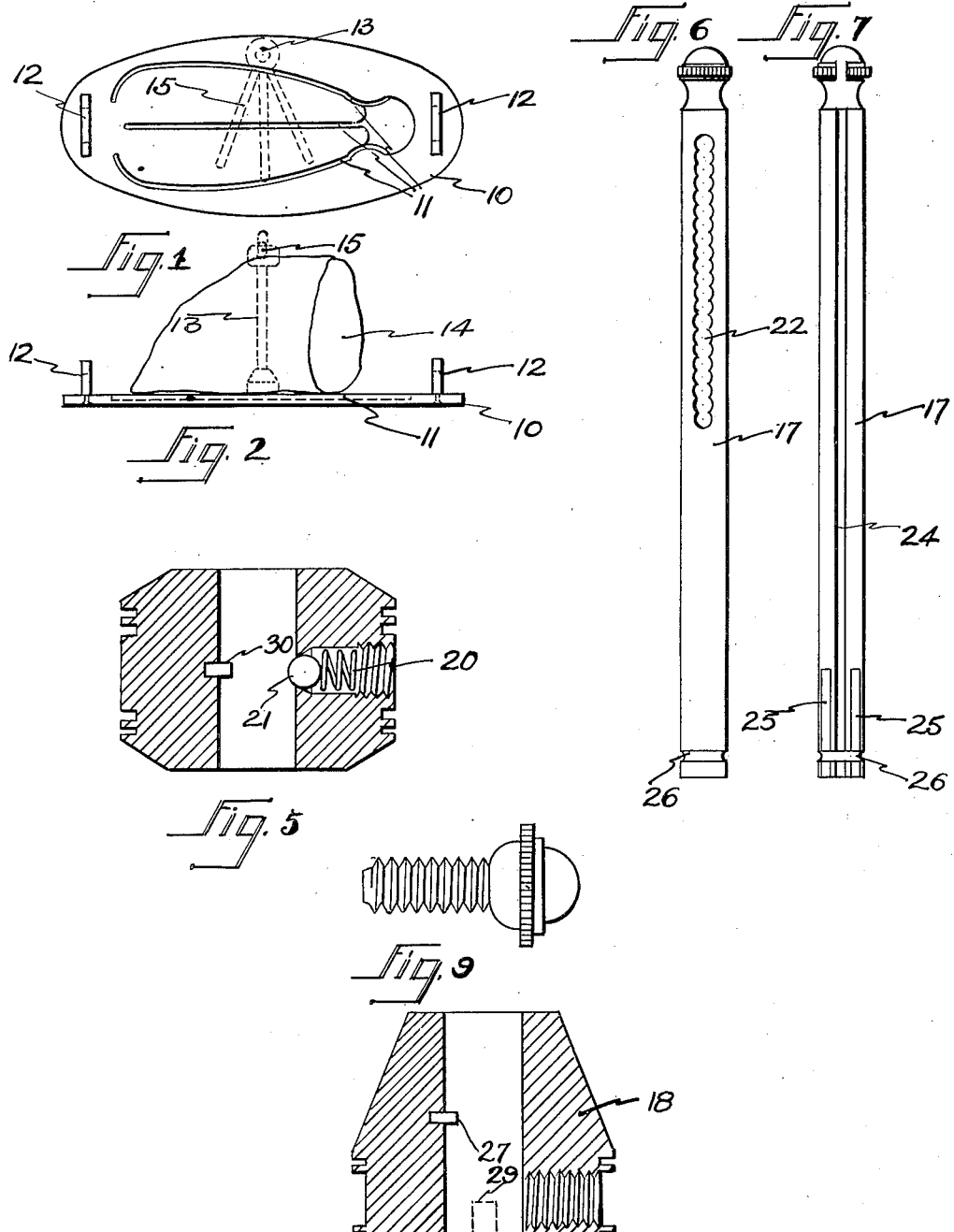
INVENTOR.
PHILIP BETTEN & MAXWELL LEHRAUPT
BY
ATTORNEY Dec. 12, 1950     P. BETTEN ET AL     2,533,308
MEAT HOLDING DEVICE
Filed June 7, 1946                          2 Sheets-Sheet 2
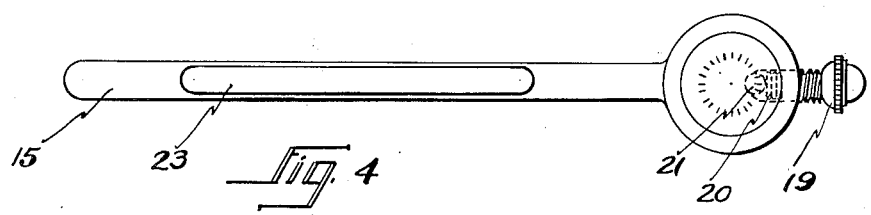
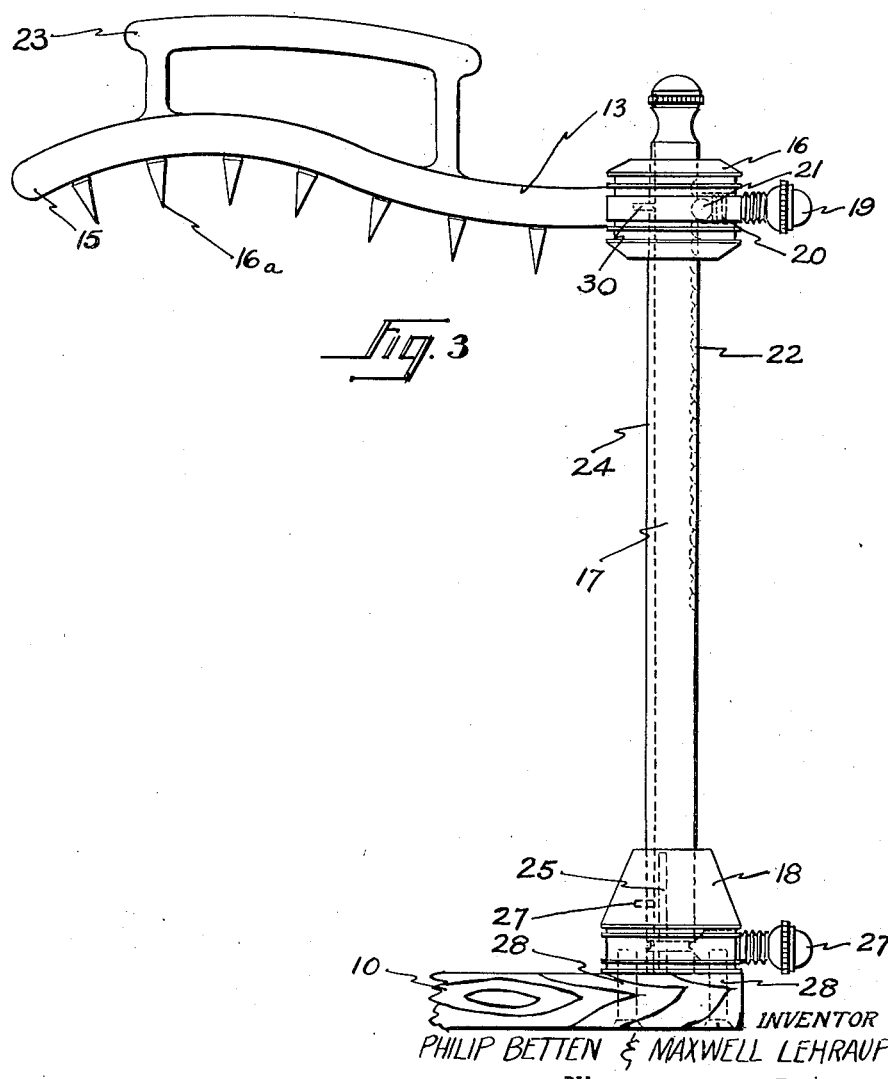
INVENTOR
PHILIP BETTEN & MAXWELL LEHRAUPT
BY
ATTORNEY Patented Dec. 12, 1950

2,533,308

UNITED STATES PATENT OFFICE 2,533,308

MEAT HOLDING DEVICE

Philip Betten and Maxwell Lehrhaupt,
Brooklyn, N. Y.

Application June 7, 1946, Serial No. 675,046

2 Claims. (Cl. 146—218)

This invention relates to improvements in food holding devices, and more particularly to the type used in connection with gripping food while it is being cut or sliced.

It is an object of the present invention to provide a very practical, efficient, useful and adjustable device to grasp various cuts of meats and other foods during cutting or carving thereof.

It is yet another object of the present invention to provide a meat holder having a great range of varying adjustments adapting food gripping means to considerable latitude of placement and holding action, and from a minimum to a maximum vertical movement.

Another object of the present invention is to provide a flexible but rigid device which will hold all cuts of meat, i. e. leg, shoulder, joint etc.

It is a further object of this invention to make the meat holding device presentable, not only in the shop but in the private home as well.

A still further object of this invention is to provide an attractive looking holder which can be manufactured in various sizes, large enough to accommodate any meat unit in the shop and small enough to be used on the dinner table for home carving of roasts and fowl.

A still yet further object of this invention is to provide a heretofore unknown, portable food holding unit.

Other objects and advantages will be in part obvious from the annexed drawings and in part hereinafter indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting certain forms of the invention have been annexed as a part of this disclosure, and in such drawings, like characters of reference denote corresponding parts throughout all the views, of which:

Fig. 1 is a plan view of a meat board and meat holding device attached thereto, made in accordance with the invention.

Fig. 2 is an elevation of the same board with a meat unit inserted to better explain and portray its use.

Fig. 3 is an enlarged view showing the rigid holder firmly attached to the meat board by a series of screws.

Fig. 4 is a plan view of the meat holder.

Fig. 5 is a cross-section of the elevation bushing and its ball bearing lock.

Fig. 6 is a view of the vertical shaft showing the indents which accommodate the ball bearing lock.

Fig. 7 is a view of the other side of circular rod where the keyways are clearly visible.

Fig. 8 is a cross-section of the base.

Fig. 9 is an enlarged view of the thumbscrew, two of which are used.

The base board 10 is of a convenient size or pattern, made of wood or metal, in which a series of grooved channels 11 appear both for design and a means of draining blood and fat, which are ever present. Handles 12 are placed near the extremities of the meat board 10 to enable easy carriage from place to place. The pronged meat holder 13 is situated in the rear center of the board 10. The pronged arm 15 can be turned to any convenient position desired, to facilitate better meat cutting.

Referring to the large drawing of the pronged meat holder in Fig. 3, it is to be noted that the arm 15 in which the prongs 16a are situated, is curved, making it possible to engage the maximum surface of an irregularly shaped meat unit 14 as in Fig. 2.

The holder consists primarily of four units—the arm 15, the sleeve member 16 to which the arm is attached, the shaft 17 on which the sleeve member 16 is elevated or lowered so that it may hold any size meat unit, and the base 18 which gives the holding device its rigidity.

To elevate or lower the arm 15, the knurled thumbscrew 19 is first loosened, so as to remove the tension in spring 20 which holds ball lock 21 firmly against indents 22 in rod 17, and then the arm 15 is adjusted to desired height by engaging handle 23. The arm 15 is prevented from turning about rod 17 because of key 30 which rides in keyway 24 of rod 17. However, if necessary, the arm 15 may be horizontally rotated either clockwise or counter clockwise easily, by first removing the rod 17 from base 18 and replacing the rod 17 so that key 27 in base 18 will engage one of the auxiliary keyways 25, thus giving the required angle of rotation. Channel 26 circling the base of rod 17 accommodates knurled setscrew 27a. Flathead screws 28 extend through base board 10 into threaded holes 29, keep the holding device in place.

It is evident from the foregoing that a great range of varying adjustments may be accomplished adapting the meat holding device to considerable latitude of placement and holding action, and to be operated from a minimum to a maximum vertical movement.

It is thus seen that the present invention comprises simple, and practical meat-grasping means, which will be safe, efficient, and reliable in use and operation. The device comprises relatively few parts which may be inexpensively manufactured and assembled and which is well adapted to accomplish, among others, all of the objects and advantages herein set forth.

It is clearly evident that the device is not only applicable for use in connection with the cutting of meats, but also other foods, such as, for example, cheese.

Without further analysis the foregoing will so fully reveal the gist of the invention that others can by applying current knowledge readily adapt it for various applications without omitting certain features that from the standpoint of the prior art fairly constitute essential characteristics of the generic or specific aspects of this invention, and, therefore, such adaptations should and are intended to be comprehended within the meaning and range of equivalency of the following claims.

Having thus described the invention, what is claimed as new and desired to be secured by Letters Patent, is:

1. A food holding device comprising a base, an upright member, means removably securing said member to said base in a plurality of horizontally rotative positions; said means comprising a socket in said base, a plurality of vertical keyways in the socket-engaging end of said member and a key in said socket adapted to selectively engage said keyways; an arm provided with prongs, and means for vertically adjusting said arm along said member, said means comprising a sleeve member secured to said arm, a keyway in said upright, a key in said sleeve member engageable with said keyway, a plurality of indents in said upright, a ball selectively engageable with said indents, and detent means operable in said sleeve member and engageable with said ball.

2. A food holding device comprising a base, an upright member, means securing said member to said base in a plurality of horizontally rotative positions; an arm provided with prongs, and means for vertically adjusting said arm along said member while preventing relative rotation of said arm and said member, said latter means comprising a sleeve member connected to said arm, a cooperating key and keyway means in said sleeve member and said upright member, a plurality of indents in said upright, and detent means disposed in said sleeve member and engageable with said indents, said detent means in turn comprising a ball, a spring exerting pressure upon said ball, and screw means operable to vary said pressure.

PHILIP BETTEN.
MAXWELL LEHRHAUPT.

REFERENCES CITED

The following references are of record in the file of this patent:

UNITED STATES PATENTS

| Number | Name | Date |
| --- | --- | --- |
| 943,910 | Breedlove | Dec. 21, 1909 |
| 1,432,481 | Mayle | Oct. 17, 1922 |
| 2,131,290 | Kochner et al. | Sept. 27, 1938 |

FOREIGN PATENTS

| Number | Country | Date |
| --- | --- | --- |
| 31,576 | Denmark | Apr. 10, 1923 |
| 239,091 | Great Britain | Sept. 3, 1925 |
| 315,112 | Italy | Feb. 16, 1934 |
| 426,101 | Great Britain | Mar. 27, 1935 |